United States Patent
Leschner (12) 
(10) Patent No.: US 6,519,588 B1
(45) Date of Patent: Feb. 11, 2003

(54) SYSTEM AND METHOD FOR REPRESENTING RELATED CONCEPTS

(75) Inventor: Jurgen Leschner, Cambridge, MA (US)

(73) Assignee: MRO Software, Inc., Bedford, MA (US)

( * ) Notice: Subject to any disclaimer, the term of this patent is extended or adjusted under 35 U.S.C. 154(b) by 0 days.

(21) Appl. No.: 09/541,335

(22) Filed: Apr. 3, 2000

(51) Int. Cl.⁷ ............................................... G06F 15/40
(52) U.S. Cl. ................. 707/3; 707/1; 707/2; 707/10; 707/100; 707/6
(58) Field of Search .................... 707/3, 10, 100, 707/1, 2, 6; 706/55, 56; 705/27

(56) References Cited

U.S. PATENT DOCUMENTS

| | | | | |
|---|---|---|---|---|
| 5,267,156 A | * | 11/1993 | Nomiyama | 707/6 |
| 5,386,556 A | * | 1/1995 | Hedin et al. | 707/3 |
| 5,579,469 A | * | 11/1996 | Pike | |
| 5,696,916 A | * | 12/1997 | Yamazaki et al. | 707/3 |
| 5,734,907 A | | 3/1998 | Jarossay et al. | 395/708 |
| 5,878,406 A | * | 3/1999 | Noyes | 706/55 |
| 6,182,062 B1 | * | 1/2001 | Fujiisawa et al. | 707/3 |
| 6,330,569 B1 | * | 12/2001 | Baisley et al. | 707/203 |

* cited by examiner

Primary Examiner—Kim Vu
Assistant Examiner—Cam-Y Troung
(74) Attorney, Agent, or Firm—Weingarten, Schurgin, Gagnebin & Lebovici LLP (57) ABSTRACT

A system and method for storing related data is disclosed, which receives a number of concepts related to the data to be stored, forms a number of relationships linking the concepts together, and which then represents the data in a way reflecting both the concepts and the relationships between the concepts. The relationships formed by the disclosed system include a number of independent aspects which add useful levels of meaning to the way the information is organized. One aspect of the relationships formed between concepts reflects predetermined application specific meanings that may be applied to individual relationships. Accordingly, the relationships provided in any specific embodiment of the disclosed system are defined to reflect a specific application of the system, such as, for example, a catalog service for receiving, storing, and publishing product-related information.

18 Claims, 7 Drawing Sheets

CONCEPTS TABLE 100

| | UNIQUE ID (102) | NAME (104) | XML TAG (106) |
|---|---|---|---|
| 108a | 10 | TREE 1 ROOT | ... |
| 108b | 50 | CD PLAYERS | ... |
| 108c | 5 | HIGH END | ... |
| 108d | 7 | MULTI-FUNCTION | ... |
| 108e | 90 | SONY | ... |
| 108f | 17 | SACD+ | ... |
| 108g | 19 | MAKE | ... |
| 108h | 20 | SACD | ... |
| 108i | 21 | MODEL X | ... |
| 108j | 22 | MODEL Y | ... |
| 108k | 11 | MAKE VAL | ... |

RELATIONSHIPS TABLE 120

| | SUBJECT CONCEPT (124) | RELATING CONCEPT (126) | RELATIONSHIP TYPE (128) | ORDERING (130) | OBJECT CONCEPT (132) |
|---|---|---|---|---|---|
| 122a | 50 | 10 | RT_A | ... | 5 |
| 122b | 50 | 10 | RT_A | ... | 7 |
| 122c | 21 | 19 | ... | ... | 11 |
| 122d | 50 | 10 | RT_C | ... | 19 |
| 122e | 19 | 10 | RT_D | ... | 90 |
| 122f | 20 | 10 | RT_D | ... | 17 |
| 122g | 5 | 10 | RT_B | ORD_A | 21 |
| 122h | 7 | 10 | RT_B | ... | 21 |
| 122i | 5 | 10 | RT_B | ORD_B | 22 |

RELATIONSHIPS TABLE 120

| | SUBJECT CONCEPT 124 | RELATING CONCEPT 126 | RELATIONSHIP TYPE 128 | ORDERING 130 | OBJECT CONCEPT 132 |
|---|---|---|---|---|---|
| 122a | 50 | 10 | RT_A | ... | 5 |
| 122b | 50 | 10 | RT_A | ... | 7 |
| 122c | 21 | 19 | ... | ... | 11 |
| 122d | 50 | 10 | RT_C | ... | 19 |
| 122e | 19 | 10 | RT_D | ... | 90 |
| 122f | 20 | 10 | RT_D | ... | 17 |
| 122g | 5 | 10 | RT_B | ORD_A | 21 |
| 122h | 7 | 10 | RT_B | ... | 21 |
| 122i | 5 | 10 | RT_B | ORD_B | 22 |

ENTRIES 122

CONCEPTS TABLE 100

| | UNIQUE ID 102 | NAME 104 | XML TAG 106 |
|---|---|---|---|
| 108a | 10 | TREE 1 ROOT | ... |
| 108b | 50 | CD PLAYERS | ... |
| 108c | 5 | HIGH END | ... |
| 108d | 7 | MULTI-FUNCTION | ... |
| 108e | 90 | SONY | ... |
| 108f | 17 | SACD+ | ... |
| 108g | 19 | MAKE | ... |
| 108h | 20 | SACD | ... |
| 108i | 21 | MODEL X | ... |
| 108j | 22 | MODEL Y | ... |
| 108k | 11 | MAKE VAL | ... |

ENTRIES 108

SYSTEM AND METHOD FOR REPRESENTING RELATED CONCEPTS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to computer based information management systems, and more specifically to a system for representing, storing, and retrieving product information.

In order to effectively market their products, product manufacturers must communicate product information to many parties, including product information aggregators such as on-line retailers or catalog suppliers, procurement partners within business to business procurement networks, prospective product purchasers ("consumers"), and others. A significant problem exists related to managing and storing large amounts of product information in a way that allows the information to be conveniently updated, while also enabling the information supplier to provide the information to multiple receiving parties in multiple formats, such that the information may be conveniently utilized for a variety of different, specific purposes.

In some existing systems, an information aggregator may collect product information from one or more information suppliers, and then store the information using a relational database (RDBMS) system, such as those provided by various RDBMS suppliers. In these existing systems, the information aggregator predefines a number of tables and columns which define how the information is to be stored and accessed. Generally, product information for a given product occupies a row or "entry" within a predefined table, and the predefined columns define the searchable attributes of the populated database. Often, the set of predefined columns cannot be modified after the database is populated without a special operation that must be performed by a system administrator. It is difficult, however, to determine a set of columns that are appropriate across different versions of a given product. It is even more difficult to determine a set of columns that are appropriate for a group of supposedly "related" products, which may be provided by different manufacturers. Additionally, it may be desirable to dynamically provide a specific "customized" information organization for a particular product, for example to reflect its "proprietary" features or some fundamental differences between it and competing products. These problems are exacerbated by the fact that significant product features or product characteristics may change over time, for example, due to new revisions or releases of the products. Moreover, for marketing purposes, different product manufacturers often seek to place emphasis on different features or product characteristics of their products with respect to competing products. Existing RDBMS solutions further assume that ordering of the data they store is implicit in the data, as may be obtained by sorting the names of people alphabetically. However, in some cases, the information supplier may desire to specify a data ordering that is content independent.

Some existing systems have responded to these complex problems by forcing large amounts of product information into a single column, sometimes referred to as the "detailed description" of the product. In one example of such an approach, only the detailed description column and a part number column are provided as searchable attributes for each product entry. With this type of existing system, targeted searching to identify and/or compare product features is very difficult. Even searching for matching text strings within the detailed description column is often ineffective, due to the use of different terminology for comparable features by different product manufacturers, and due to changes in terminology over time.

When product information aggregators provide static, pre-formatted tables of product information with a predetermined set of attribute columns, such predetermined columns cannot generally be dynamically controlled or configured, for example by the product manufacturers. Such systems also fail to provide a convenient mechanism for product information suppliers to dynamically modify individual product entries within the tables. In particular, while well understood features or product characteristics can be reflected to some extent by such predefined tables, no convenient mechanism is typically provided in existing systems for dynamically adding proprietary features or characteristics of a given product or product category to column definitions or headings.

Accordingly it would be desirable to have a system for product information maintenance and storage which permits product information suppliers to conveniently update the information regarding particular products, as well as the way such information may be referenced and or retrieved. The system should further be capable of providing the information to a variety of publishing destinations, such as product aggregators, procurement partners, and/or consumers, in a way that enables effective product feature research and/or comparison.

BRIEF SUMMARY OF THE INVENTION

In accordance with the present invention, a system and method for storing related data is disclosed. The disclosed system treats all information it receives and stores as a number of discrete "concepts". The system receives a number of concepts related to the data to be stored, such as product names, product categories, and/or product characteristics, forms a number of relationships linking the concepts together, and then represents the data in a way reflecting both the concepts and the relationships between the concepts. The relationships formed by the disclosed system include a number of independent aspects which add useful levels of meaning to the way the information is organized. One aspect of the relationships formed between concepts reflects application specific meanings that may be applied to individual relationships. Accordingly, the relationships provided in any specific embodiment of the disclosed system are defined to reflect a specific application of the system, such as, for example, a catalog service for receiving, storing, and publishing product-related information.

In general, relationships may be formed to distinguish a subset of concepts from other concepts stored within a common data structure. In a tree data structure, relationships may be provided indicating that a number of concepts are distinguishable from other concepts within the same tree data structure, and which are stored as children of a common parent node. An ordering aspect of a relationship may also be provided indicating an ordering of child concepts under a common parent node within the tree. Because application specific meanings provided by the relationships may be defined to support various specific applications, the disclosed system is applicable to any kind of information storage and retrieval application. Accordingly, while the illustrative embodiments are described in connection with a product information application, the present invention is not limited to such an application, and may be applied advantageously to any data storage and retrieval application which seeks to provide a meaningful representation of data.

In an illustrative embodiment for storage and retrieval of product information, the disclosed system receives and stores concepts describing product information in a way that enables information suppliers to conveniently and dynamically add to and/or modify those stored concepts. The disclosed system may further be employed to organize the information it receives in a way that reflects both shared attributes and proprietary concepts related to various products. In an illustrative embodiment, a set of concepts is first obtained, as well as associated concept names. Such concepts and associated names may, for example, originate in part or in whole a priori through a committee process in which various product manufacturers provide input and are permitted to vote on a resulting shared concept set. Such predetermined concepts are referred to herein as "shared" concepts. "Private" concepts may also be obtained from individual information providers. The resulting concept set is then employed to generate the relationships used in the disclosed system. In an illustrative embodiment, a unique identifier is assigned to each of the concepts in the resulting concept set.

When the system has been "initialized" with the appropriate predetermined concept set, for example including a number of shared concepts, a product information supplier can begin the process of entering product information for one or more products. The product information supplier may optionally indicate a subset of a predetermined, shared concept set which should be applied to certain product information it provides or has provided. The product information supplier may further optionally provide one or more private concepts, for example associated with a private concept name, that are also to be applied to the storage organization and accessibility of certain associated product information. In the case where one or more private concepts are provided, the disclosed system may also then assign a unique identifier to each of the provided private concepts.

In order to store the product information, a set of relationships are formed which reflect an information model, and which are determined in response to both the content and context of the received concept set. As a result, the information model can be populated with product information in a way that stores the provided concepts in a useful and meaningful way. The relationships linking various ones of the received concepts include a number of aspects, and impose application specific meanings on portions of an information structure reflecting the information model.

A "relating concept" aspect of a relationship, allows for dynamic modification of an information structure without the need to modify a priori defined information, such as predetermined application specific meanings. Thus the "relating concept" aspects of relationships are determined based on explicit or implicit inputs received from users of the disclosed system. The "relating concept" aspect of a relationship may be used to indicate that a relationship is applicable within a specified information structure, such as a tree. The "relating concept" aspect of a relationship may also be used to indicate that a particular characteristic value is attached to a product, and further allows extension of an information model to describe one or more product characteristics that are applicable to products within a product category.

The "application specific meaning" aspect of a relationship reflects a selected one of a plurality of predetermined "meanings" that may be associated with the relationship, and which are determined a priori with regard to use of the system to receive data to be stored. For example, the set of "application specific meanings" for a given application of the disclosed system may be defined at design time, and reflected by the resulting executable code implementing the system.

In an illustrative embodiment for storing product information, the "application specific meaning" aspect of a relationship indicates certain meanings that are applicable to an information model representing product information. A first such application specific meaning would, for example, indicate that the relationship reflects a "product category" relationship between two concepts. Relationships may thus be formed indicating that a concept is a product category within another concept, such as a catalog tree. Further, the application specific meaning aspect of a relationship may indicate that the relationship reflects "product" relationship between the related concepts. The "product" application specific meaning indicates that a particular concept represents a specific product with respect to another concept, which may be, for example, a product category. A "product characteristic" application specific meaning may be used to form relationships indicating that a concept is a characteristic or feature of each product within a product category. Relationships indicating the "product characteristic" application specific meaning may then be used to determine what characteristics should be specified when product information is being entered for a product within a given product category.

Further for purposes of example, an illustrative "possible value" application specific meaning may be used to form relationships indicating that a concept is one of potentially several alternative values that may be associated with another concept. Such a "possible value" relationship may be used to prompt a user of the system with a number of alternative values that may be input in association with a particular product feature or characteristic.

Another independent aspect of a relationship allows a data independent ordering to be specified between the two related concepts. For example, where a first object is indicated by a first relationship to be a parent to a second concept, and by a second relationship to be a parent of a third concept, the independent ordering aspects of the first and second relationships may be used to indicate an ordering between the second and third concepts. Such an ordering may be used when displaying the various concepts, for example to ensure that the third concept is always displayed prior to or ahead of the second concept.

While a number of examples of application specific meanings are provided herein with regard to an illustrative embodiment for maintaining product information in a catalog service, it will be recognized by one of ordinary skill in the art that other application specific meanings may be generated for specific applications of the disclosed system, and that the present invention is not limited to the illustrative embodiments described herein.

Further in an illustrative embodiment, the information model reflecting the various concepts and relationships is used to generate an information structure for storing the received product information. For purposes of illustration, the illustrative information structure organizes the product information as an N-tree data structure. In such an embodiment, the relationships between concepts additionally indicate a parent-child relationship between the two concepts linked by the relationship, for example, as indicated by way of the application specific meaning aspect of the relationship. However, those skilled in the art will recognize that the invention is not limited to such an embodiment, and any other suitable data structure may be employed. Moreover, product information concepts used to populate such a data structure may be indicated by, identified by, or received from a user through a variety of interfaces, including World Wide Web-enabled, Internet browser based graphical user interfaces (GUIs).

In this way there is disclosed a system for product information maintenance and storage which permits information suppliers to conveniently update information, for example information regarding particular products, as well as the attributes which control how such information may be referenced and or retrieved. The disclosed system can be used to publish product information to a variety of publishing destinations, in a way that enables the information to be conveniently formatted into a variety of specific catalogs, and which enables different information consumers, such as product information aggregators, to use the information in a variety of ways.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
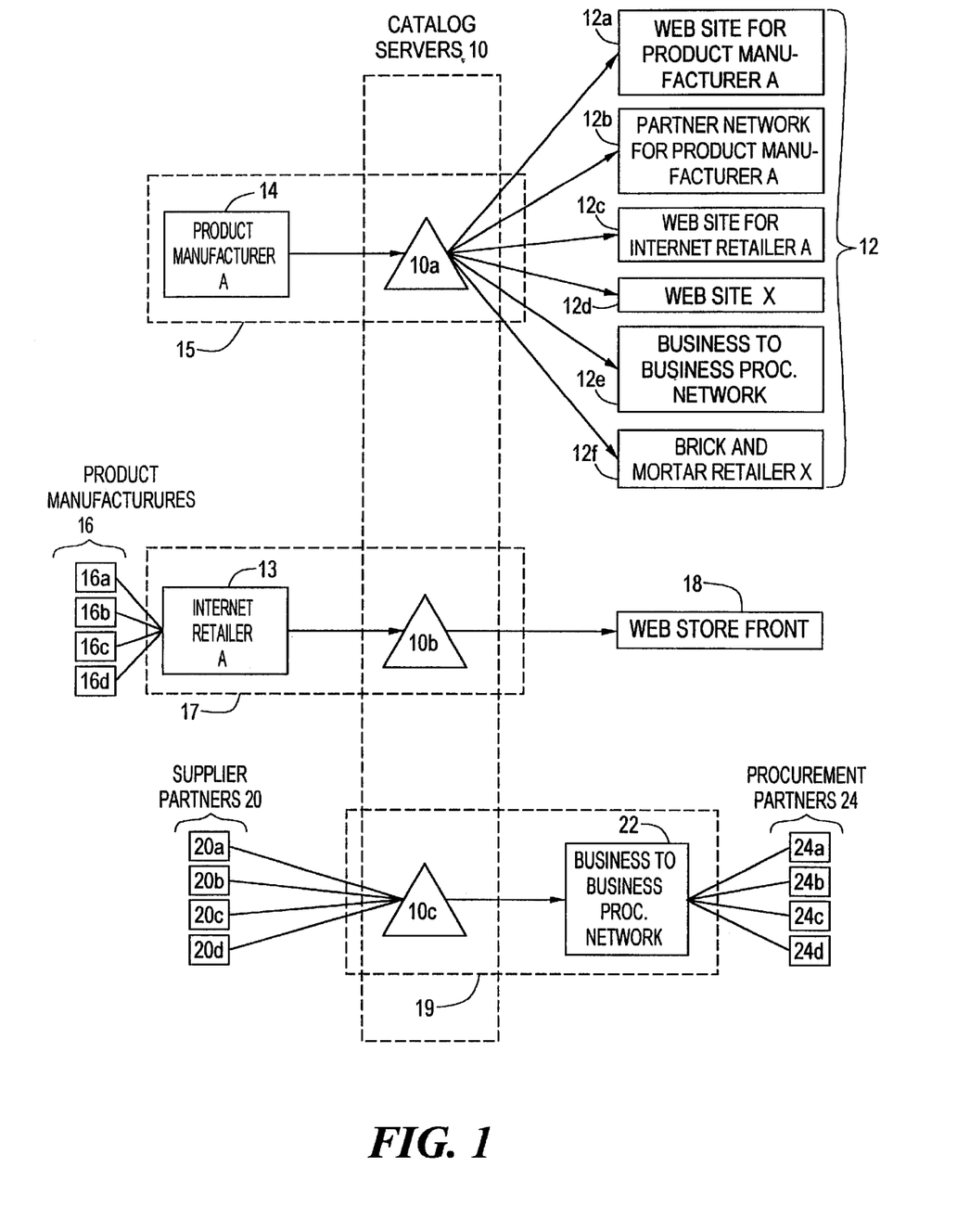
FIG. 1 shows instances of an illustrative embodiment of the present invention operating over the Internet.

As depicted in FIG. 1, an illustrative embodiment of the disclosed system operates using World Wide Web (WWW) technology over the Internet to provide communications between software entities executing on a number of computer systems. The software entities in the illustrative embodiment of FIG. 1 are shown including a number of catalog servers, shown for purposes of example as catalog service server instances 10. Communications between the software entities in FIG. 1 may be provided using various conventional communication protocols and message formats, including those based on the HyperText Transfer Protocol (HTTP) and the Internet Protocol (IP).

A first one of the catalog service server instances 10, catalog server 10a, is shown operating to publish product information to a number of publishing destinations 12. The catalog server 10a is further shown receiving product information from product manufacturer A 14 over an account connection 15. The publishing destinations 12 are shown including a web site 12a associated with product manufacturer A 14, a partner network 12b for product manufacturer A, a web site 12c for an internet retailer A 13, a web site X 12d, a business to business procurement network 12e, and a "brick and mortar" retailer X 12f. The web site for internet retailer A 13 is an example of a publishing destination that is a multi-source, product information aggregator, which provides product information to potential customers regarding products from a variety of manufacturers and/or distributors. The brick and mortar retailer X 12f is an example of a publishing destination which distributes the information provided to it from the catalog server 10a on a limited basis, for example, internally via an intranet to display systems within one or more stores.

Catalog server 10b is shown receiving product information from Internet retailer A 13, over an account connection 17. The Internet retailer A 13, in turn, receives information regarding a number of different products from product manufacturers 16, and publishes product information to the web storefront 18. The web storefront 18 is an example of a publisher of product information, which is dedicated to providing product information to consumers regarding products that can be purchased through Internet retailer A 13.

Catalog server 10c is shown providing product information to a business to business procurement network 22 over an account connection 19. In this way, the business to business procurement network 22 receives information regarding a variety of products from a number of supplier partners 20. The catalog server 10c is further shown publishing product information to a number of procurement partners 24, through the business to business procurement network 22.

As will be recognized by those skilled in the art, the catalog service server instances 10 may, for example, be software application programs executing on one or more hardware system platforms, on which are also executing World Wide Web enabling software, such as Internet Browsers. Such server system hardware platforms, for example, may include a conventional processor, memory, and input/output devices, as are found in generally available personal computers, server computers, mainframe computers, and/or workstations. However, the present invention is not limited to such an embodiment, and various alternative configurations may be employed to provide the functionality described herein in association with the catalog service server instances 10, including a configuration in which the catalog service server instances are co-located or co-resident with one or more of the software entities associated with and/or controlled by product information suppliers 14, 13, and/or 20, or publishing destinations 12, 18 and/or 24.

Figure 2:
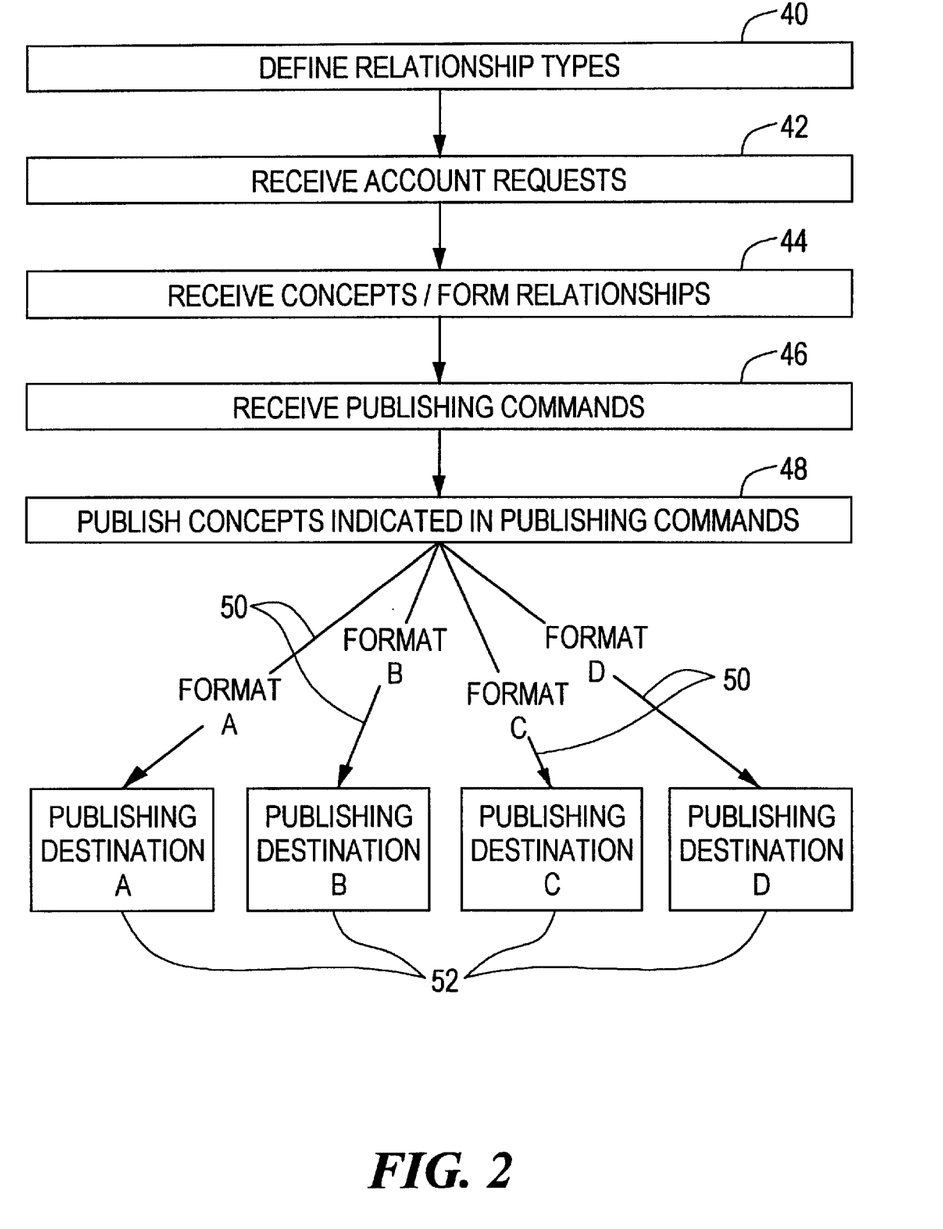
FIG. 2 is a flow chart showing steps performed in an illustrative embodiment of the present invention.

An example of the operation of the elements shown in FIG. 1 is now described in connection with the steps shown in the flow chart of FIG. 2. At step 40 of FIG. 2, a number of application specific meanings, referred to for purposes of example as "relationship types", are defined or obtained which may be employed to form relationships that impose useful meanings on a set of received concepts. For example, in an embodiment of the disclosed system for storing product related information, "product category", "product", "product characteristic", and "possible value" relationship types may be defined at step 40. In the example of FIG. 2 the set of relationship types defined at step 40 are determined a priori to receipt of concepts from an information supplier, based on the specific system requirements of the illustrative application.

At step 42 of FIG. 2, a product information supplier establishes an account with a server instance of the disclosed system, thereby setting up an associated account connection. A catalog server instance is created at step 42. The step of establishing an account enables the information supplier to provide information to the catalog service server instance, for subsequent publication to a number of publication destinations.

Figure 5:
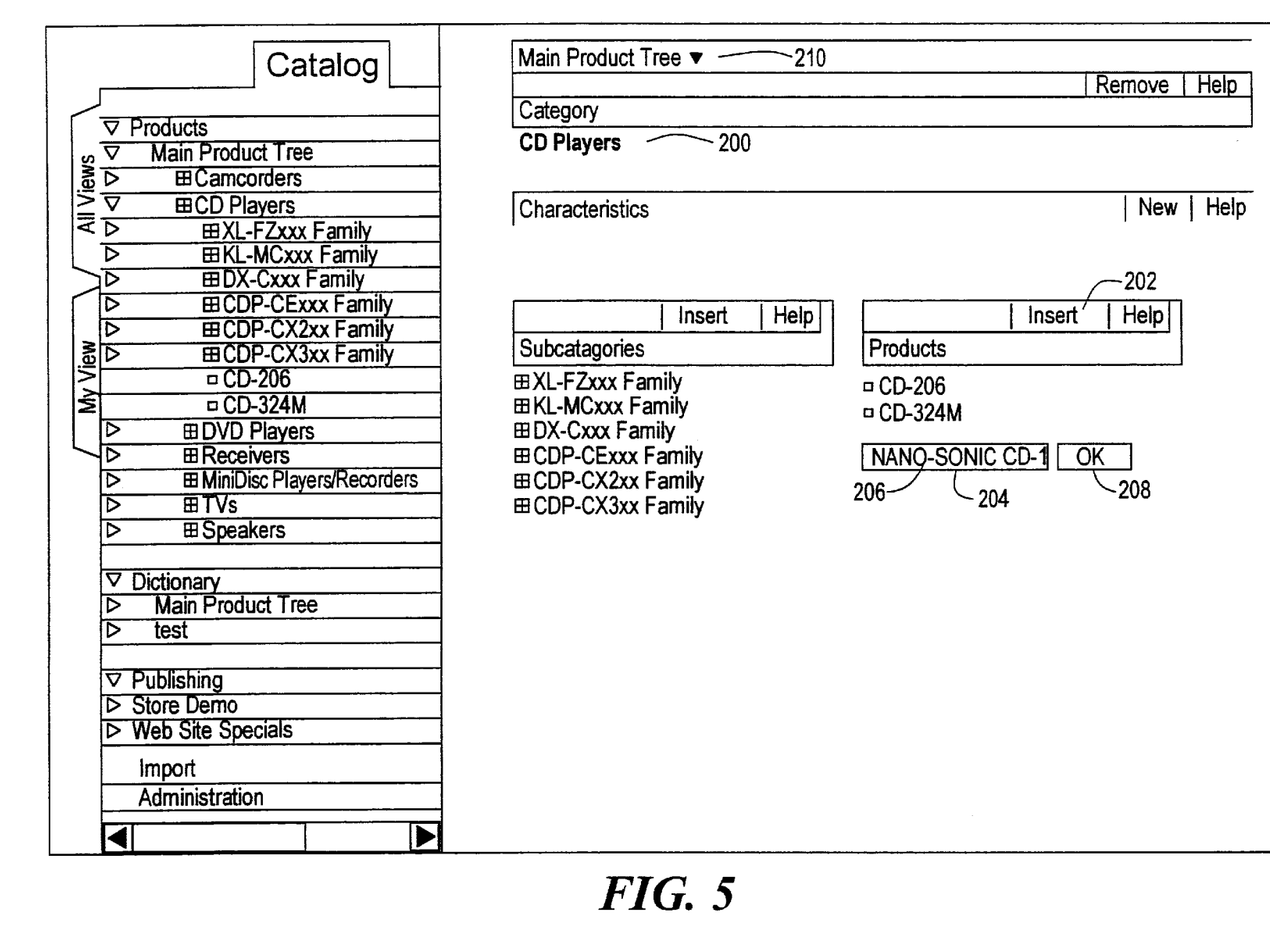
FIG. 5 shows a screen display illustrating an "add product" user input context.
Figure 6:
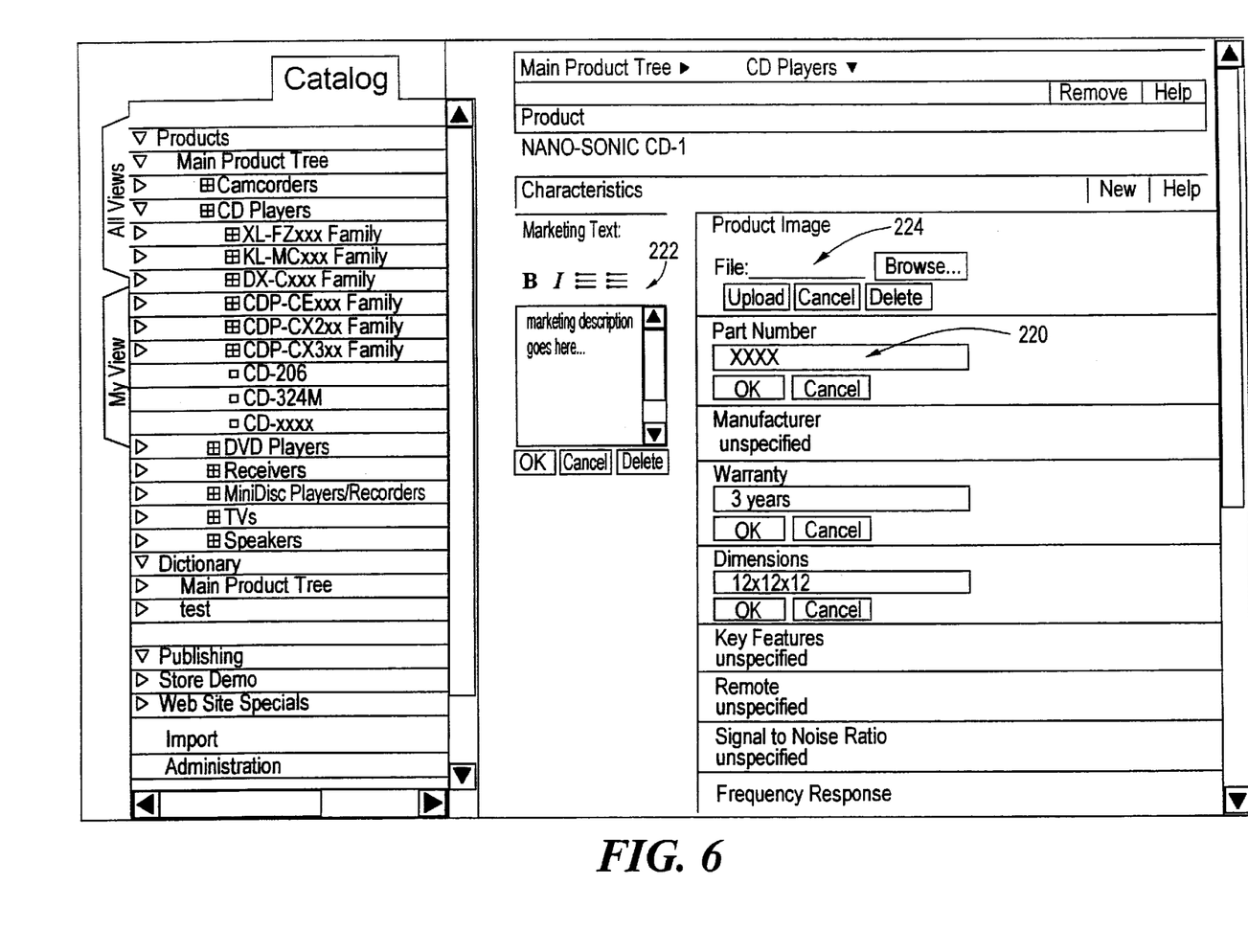
FIG. 6 shows a screen display illustrating an "add product characteristic value" user input context.
Figure 7:
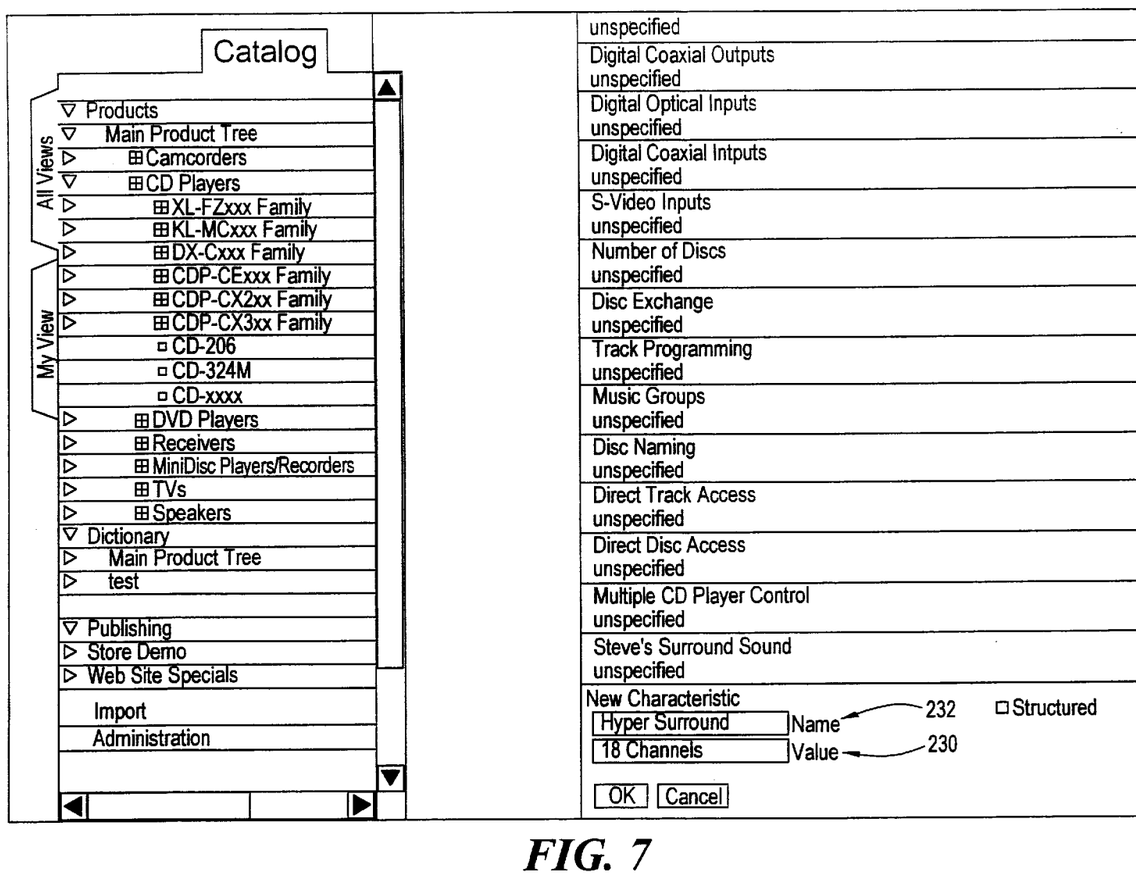
FIG. 7 shows a screen display illustrating an "add new product characteristic" user input context.

At step 44, a set of concepts are obtained by the catalog service server instance (catalog server) created at step 42. As shown in FIGS. 5–7 and described below, concepts may be entered manually. In addition to or as an alternative to the manual input process described with reference to FIGS. 5–7, in an illustrative embodiment, concepts can be imported into the disclosed system using XML or other ASCII text file formats. XML allows textual information to be tagged with XML tags called "elements". XML elements may be used to surround each piece of information related to a concept, as shown below:

<element>. . . information . . . </element>

Different XML elements can be nested, allowing for hierarchical structures, for example describing categories of products, in which each product has a number of characteristics. Such an approach is illustrated below:

<CD_players>
  <product>
    <name>Nano-Sonic CD-1</name>
    <part_Number>xxx-xxx-xxx</part_Number>
    <Hyper_Surround>18 channels</Hyper_Surround>
  </product>
</CD_players>

In an illustrative embodiment, the disclosed system reads XML files, matches the elements in the XML files to existing concepts, and automatically creates relationships to represent the information in the XML file.

The disclosed system may further publish XML files in a format similar to the example above, based on the concepts and relationships stored in the system.

In an illustrative embodiment, a number of shared concepts may be initially determined by and/or provided from a product supplier committee, and then either entered into the catalog server instance via an appropriate input or configuration interface, or hard-coded directly into the catalog server software. Each of the shared concepts, for example, may be associated with a respective shared concept name, which may also be input at step 44. Further at step 44, the product information supplier may optionally provide a set of private concepts and/or relationship types, for example which represent proprietary product categories, product characteristics, alternative possible values, and/or types of concept relationships relevant to, and available for describing, products for which that product information supplier provides information. Such private concepts may each be associated with a private concept name, which may also be input at step 44. The private concepts received at step 44 are processed at step 44 by the catalog service server instance, by generating, modifying and/or augmenting a number of data structures, such as the tables shown in FIG. 4, in order to represent an information model, such as the information model shown in FIG. 3. While the illustrative embodiment is described in connection with the use of both shared and private concepts, the present invention is not limited to such an embodiment, and alternative embodiments may include only a single class of concepts, which may be considered either shared or private.

The relationships formed in step 44 between concepts received in step 44 may be represented using entries in a number of tables, such as the tables described in connection with FIG. 4, or any other appropriate data structure. The specific relationships that are formed may, for example, be based on the input context in which the specific concepts to be linked by a given relationship are received. Illustrative contexts which result in the formation of a specific relationship between a number of concepts are described below with reference to FIGS. 5–7. The relationships formed at step 44 may be used to meaningfully organize and/or access the information stored by the disclosed system. Additionally, the representation of the information model may use an N-tree organization to store the received product information in a way that enables the product information to be accessed in accordance with the information model, for example through the tables shown in FIG. 4. In such a case, the relationships between concepts would also establish a parent-child relationship between the linked concepts.

The information supplied at step 44 provides product item information that is used for later publication through the catalog service server instance. For example, such item information describes the features and/or characteristics of one or more product items. In the illustrative embodiment, the item information received at step 44 is treated as a number of concepts. For example, each product, product feature or characteristic is treated as a separate concept for purposes of storage and retrieval.

At step 46, the catalog service server instance created at step 42 receives a number of publishing commands, for example from a user operating over an account connection with an information supplier. In the illustrative embodiment of FIG. 2, the information stored by the disclosed system is published using a "push" model, in which a information supplier user or program provides a publishing command over an account connection, indicating that some or all of the product information stored by the system should be published to one or more indicated publishing destinations. Alternatively, a "pull" model may be employed, in which publishing destinations issue publishing requests in order to receive product information stored by the disclosed system.

At step 48, the catalog service server instance references those concepts necessary to satisfy the publishing commands received at step 46. As a result of step 48, the catalog service server instance provides product information in a number of different output formats 50 to a corresponding number of product information publishing destinations 52.

The relationships formed between concepts in the disclosed system enable the stored product information to be conveniently manipulated when it is published. For example, relationships may be associated within a common data structure, for example using a common "relating concept" relationship aspect for each of the associated relationships. Such a shared "relating concept" can be used to organize the product information into subsets, and accordingly to limit the published data for a particular publication destination to include only a subset of all stored products or product categories. The "product characteristic" application specific meaning can be used to indicate specific product characteristics to be published, or to arrange the hierarchy of the published data. Further, the ordering aspect of the relationships permit the stored information to be published in a way reflecting a specified ordering.

Figure 3:
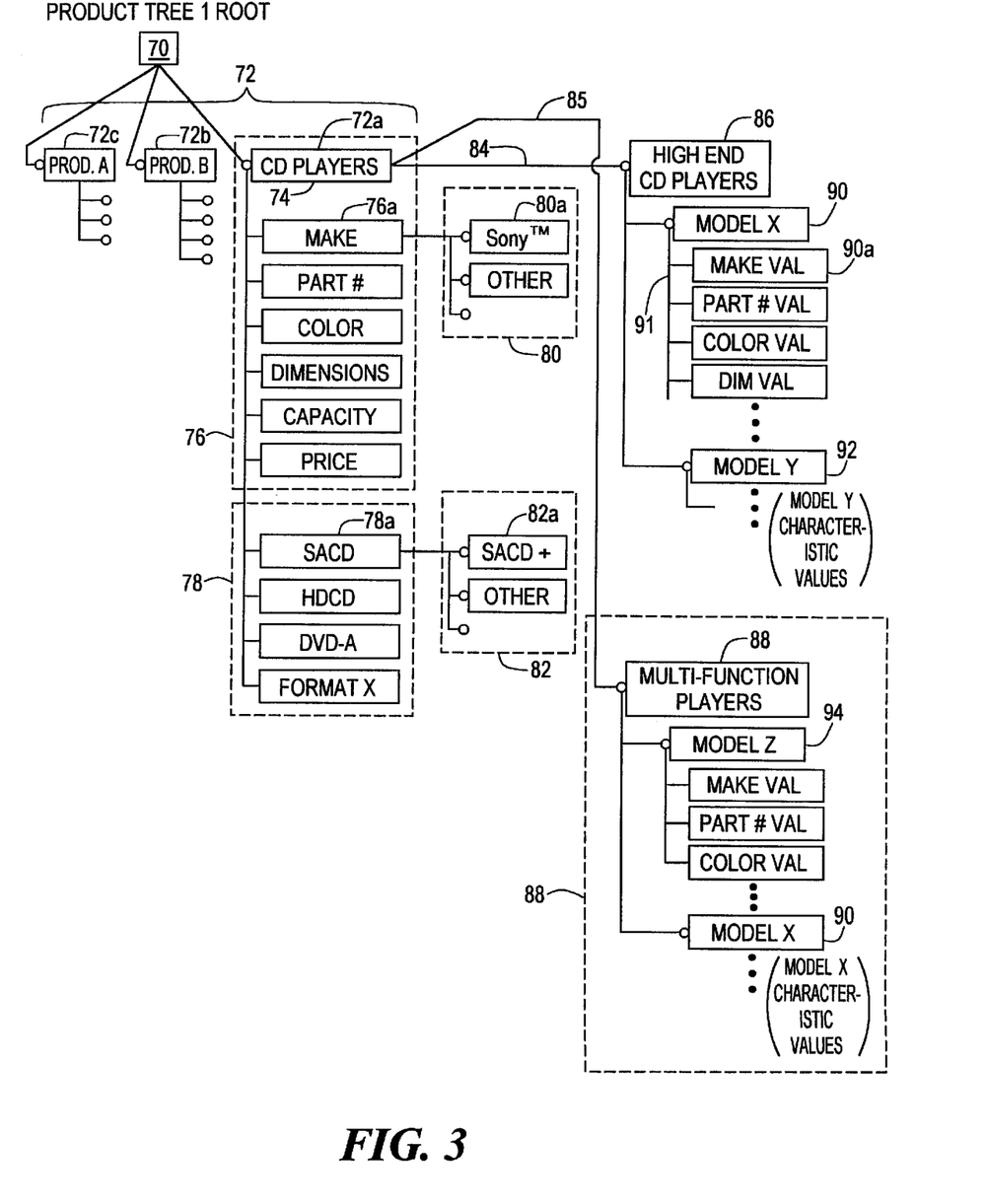
FIG. 3 shows an illustrative information model.

The elements of FIG. 3 illustrate an information model maintained by an embodiment of the disclosed system. Each of the elements shown in FIG. 3 represents a concept received from an information supplier, while each of the lines connecting the elements in FIG. 3 represents a relationship formed by the disclosed system between received concepts. The organization of the concept elements in FIG.

3, therefore, reflects the relationships formed by the disclosed system, for example in step 44 of FIG. 2. The relationships represented by the lines connecting the concepts in FIG. 2 define both the parent-child relationships between concepts, as well as providing additional application specific meanings, ordering information, and indication of relating concepts. For example, the relating concept aspect of the relationships illustrated by lines connecting the categories 72 to the product tree root 1 70 may be the product tree root 1 70 concept itself, indicating that the categories 72 reside within the common structure shown in FIG. 3.

As shown in FIG. 3, a root concept 70 of a product tree, for example named "product tree 1", is shown related to a number of child concepts consisting of product categories 72. Accordingly, each of the lines connecting the root concept 70 of the product tree shown in FIG. 3 to each of the product categories 72 represents a relationship indicating the "product category" application specific meaning. The product category 72a is shown as a compact disc player product category, to be used to store information related to specific compact disc player products. The compact disc player product category 72a is shown related to a number of child concepts, including shared characteristic concepts 76, and potentially one or more private characteristic concepts 78. The lines connecting the compact players concept 72a to each of the shared and/or private characteristics, therefore, represent relationships expressing the "product characteristic" application specific meaning. The characteristics linked to the compact disc player product category define a characteristic set that applies to all product items under that product category.

A number of pre-defined characteristic types may be employed to add further meaning to the way the disclosed system stores the concepts it receives. Such pre-defined characteristic types may be indicated by the value of one or more flags stored in association with the relationship, for example, stored as a portion of the relationship type field 128, further described below in connection with FIG. 4. Characteristics may be specified as "single-valued" when they can only have one value (such as a weight), and as "multi-valued" when they can have multiple values (such as a number of available colors). A "structured" characteristic may be specified which can have a value selected from a limited number of predefined values. An "unstructured" characteristic, in contrast, is not limited to any predefined value or values, and may be linked to a value indicating an arbitrary text string, file, image, or web page. Characteristics may further be defined as "inherited", such that they apply to all levels below the product category to which they are linked, or "non-inherited", such that they only apply at the product category level. Non-inherited characteristics such as this may be useful for providing product category descriptions that only apply at one level. Characteristics may further be defined as "optional", meaning that they need not be filled in for each product, or "required", meaning that some indication, warning, or error message will be provided to a user if they are not provided with a value for a given product. Additionally, characteristics may be defined as "unique", indicating that only one product can have a given value for that characteristic at one time, or "non-unique", indicating that multiple products may have the same value for that characteristic.

A number of child concepts, consisting of alternative possible values 80, are shown related to the "MAKE" characteristic 76a of the compact disc player product category 72a, including a predefined "SSONY™" possible value 80a. Accordingly, the relationships illustrated by the lines connecting the concepts 80 to the MAKE concept 76a express the "possible value" application specific meaning. Similarly, a number of alternative characteristic possible values 82 are also shown associated with the "SACD" characteristic 78a of the compact disc player product category 72a, including an "SACD+" possible value 82a. Thus, the relationships illustrated by the lines connecting the concepts 82 to the SACD concept 78a also express the "possible value" application specific meaning. These alternative possible values may be, for example, displayed to a user that is inputting product information as potential alternative values for selection or indication in connection with product information concepts being provided for a compact disc player.

Figure 4:
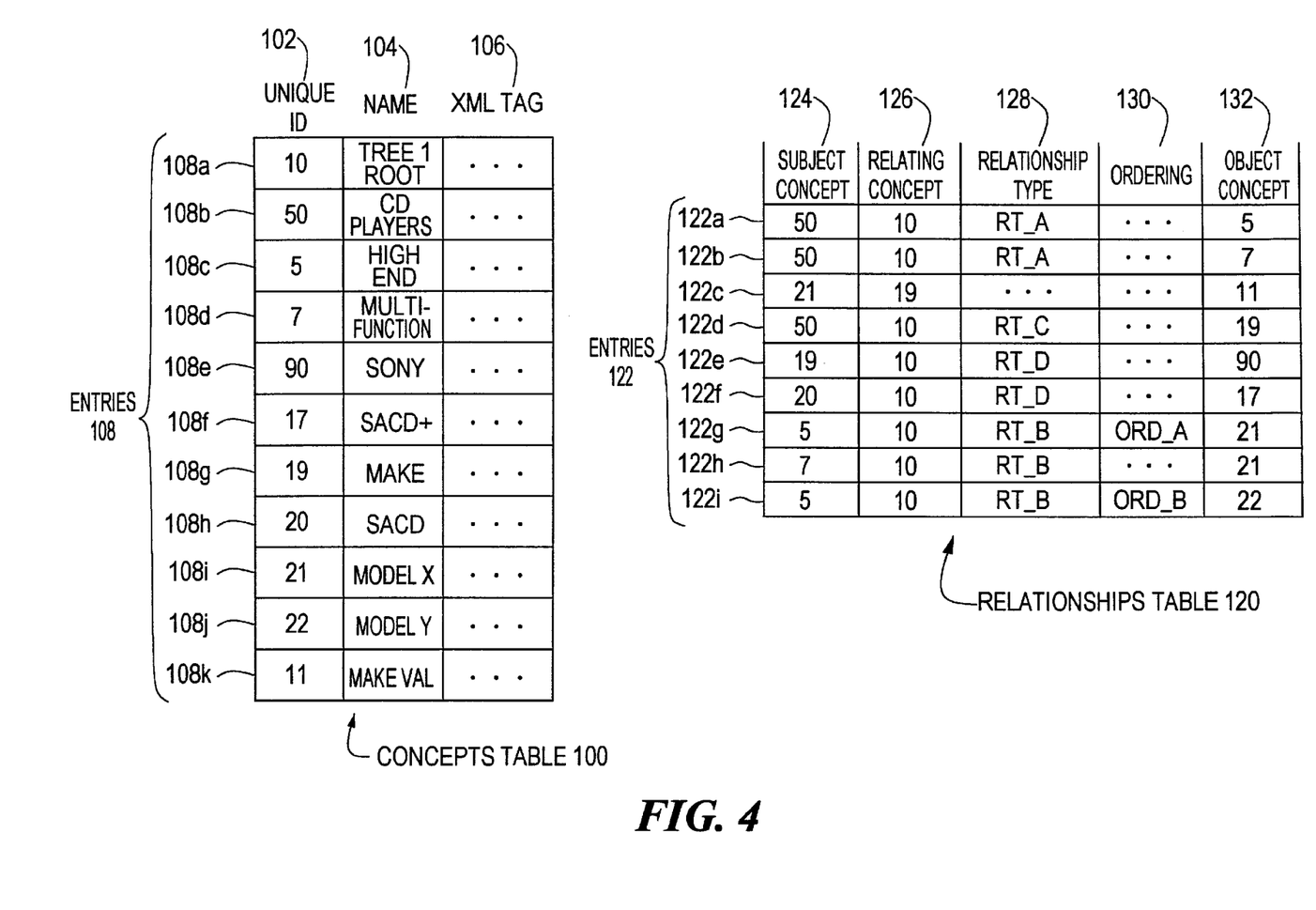
FIG. 4 shows tables used in an illustrative embodiment to define relationships between concepts.

The information model illustrated by the root 70 of product tree 1, the items categories 72, and the relationships linking those concepts together in FIG. 3 may be represented using a number of information structures, such as the tables shown in FIG. 4, that may further be populated with concepts describing actual, specific products. For example, the compact disc item product category 72a could be populated with several compact disc item concepts, each corresponding to a specific compact disc player. As shown in FIG. 3, a sub-product category 86 of products related to the compact disc product category 72a is related to ("contains") a number of "high end" compact disc players, and is specifically related to the compact disc players product category by the relationship 84. The relationship 84, for example, expresses the "product category" application specific meaning.

The high end compact disc players product category 86 is related to a number of other child concepts, shown as including a number of specific compact disc player product concepts, for example model X 90, and model Y 92. The product concepts 90 and 92 are in turn related to child concepts for actual values corresponding to the characteristics of the associated compact disc player products. The characteristics of the product concepts 90 are defined with relation to the compact disc player product category 72a, such as MAKE, PART#, COLOR, etc. In this way, the characteristics defined for the product category 72a become named attributes of the product concepts within that product category. Such attributes of a product concept can be related to that product concept using relating concepts consisting of characteristics for the category in which the product is defined. For example, the relationship between the Model X 90 concept and the Make Value concept 90a, represented by the line 91, would have a relating concept equal to the Make characteristic concept 76a.

A multi-function player sub-category 88 is further shown as a child-concept related to the compact disc player product category through a relationship 85, which also expresses the "product category" application specific meaning. The multi-function player product category concept 88 is shown related to child-concepts consisting of the model Z compact disc player concept 94, as well as the model X compact disc player concept 90, for example by relationships expressing the "product" application specific meaning.

FIG. 4 shows tables used to define relationships between concepts in an illustrative embodiment. A Concepts table 100 includes a number of entries 108, each corresponding to a concept. The Concepts table 100 is shown including a Unique ID column 102, a Name column 104, and an XML Tag field 106. Each of the columns 102, 104 and 106 shown in the Concepts table 100 are searchable attributes of the table. Accordingly, searches may be directed to the contents of individual columns in the table 100, in order to identify entries matching certain search strings or values within one or more of those columns.

In an illustrative embodiment, a translation copy of the concepts table is also maintained. Such a translation copy of the concepts table may, for example, be used to store corresponding natural language translations for one or more characteristics or aspects of each concept represented within the concepts table. For example, each entry in a translation copy of the concepts table 104 could be used to store a natural language translation of a concept name stored in the name field 104 of a corresponding entry within the concepts table 104. Each entry within such a translation copy of the concepts table 100 may, for example, be indexed using the same Unique ID value as may be used to index the corresponding entry in the concepts table 104.

The Unique ID 102 for an entry is assigned by the disclosed system, and is unique across the complete concept set, including both shared and private concepts. The Name 104 for an entry may be a private concept name or shared concept name provided by a product information supplier, and the XML Tag field 106 may be used to store or indicate the XML element name associated with the concept.

In the embodiment shown in FIG. 4, the Concepts table entry 108*a* has a Unique ID of 10, a concept Name consisting of the string "Tree 1 Root", and corresponds to the product tree 1 root 70 shown in FIG. 3. In an alternative embodiment, the concept Name for table entry 108*a* could be equal to a name of a specific product information catalog. The Concepts table entry 108*b* has a Unique ID of 50, a concept Name of "CD Players", and corresponds to the compact disc player product category 72*a* shown in FIG. 3. The Concepts table entry 108*c* has a Unique ID of 5, a concept Name of "High End Compact Disc Players", and corresponds to the high end compact disc player product category 86 shown in FIG. 3. The Concepts table entry 108*d* has a Unique ID of 7, a concept Name of "Multi-Function Players", and corresponds to the multi-function players product category 88 shown in FIG. 3. The Concepts table entry 108*e* has a Unique ID of 90, a concept Name of "SONY", and corresponds to the "SONY" characteristic possible value 80*a* shown in FIG. 3. The Concepts table entry 108*f* has a Unique ID of 17, a concept Name of "SACD+, and corresponds to the "SACD+" characteristic possible value 82*a* shown in FIG. 3. The Concepts table entry 108*g* has a Unique ID of 19, a concept Name of "MAKE", and corresponds to the characteristic "MAKE" 76*a* shown in FIG. 3. The Concepts table entry 108*h* has a Unique ID of 20, a concept Name of "SACD", and corresponds to characteristic 78*a* shown in FIG. 3. The Concepts table entry 108*i* has a Unique ID of 21, a concept Name of "MODEL X", and corresponds to the MODEL X item 90 shown in FIG. 3. The Concepts table entry 108*j* has a Unique ID of 22, a concept Name of "MODEL Y", and corresponds to the MODEL Y item 92 shown in FIG. 3. The Concepts table entry 108*k* has a Unique ID of 11, a concept Name of "Make Val", and corresponds to the Make Val value 90*a* shown in FIG. 3.

The Relationships table 120 includes a number of entries 122, each one of which defines a relationship between a subject concept whose unique concept ID is stored in the Subject field 124 of the entry, and an object concept whose unique concept ID is stored in the Object field 132 of the entry. For purposes of illustration, and in response to the application specific meaning indicated by the Relationship Type field 128, the entries 122 of the Relationships table 120 may further establish a parent-child relationship between the concept indicated by the Subject field of the entry and the concept indicated by the Object field of the entry. Which of the related concepts is considered the parent concept, and which is considered the child concept, is determined by the application specific meaning indicated by the Relationship Type field 128. Those skilled in the art will recognize that the parent concept could alternatively be stored by either the Object field or the Subject field of an entry. Through either approach, the relationships defined by the entries in the Relationship table 120 also define an N-tree data structure of concepts.

In addition to any parent-child relationship that may be defined between the related concepts, each entry in the Relationships table 120 defines several independent aspects of the relationship linking the Subject and Object concepts. The aspects of a relationship for a subject/object concept pair are independently defined by values contained in the Relating Concept 126, Relationship Type 128, and Order 130 fields of the associated entry in the Relationships table. The value of the Relating Concept field 126 may indicate whether the Subject and Object concepts are within a common information structure, for example, a tree. The Relating Concept field 126 may also indicate a characteristic concept of a product category, in order to link a specific value for that characteristic to a specific product within that product category, as shown in FIG. 3 by the relationship represented by line 91 between the Make Val concept 90*a* and the Model X product concept 90.

In the example shown in FIG. 4, a number of the entries in the Relationships table 120 have a value of 10 in their Relating Concept field 126, indicating that they are within a common information structure identified by the concept having a Unique ID of 10, such as the tree illustrated by the information model shown in FIG. 3, which is identified by the concept corresponding to the product tree 1 root 70. In an embodiment in which the information is organized into one or more tree data structures, the value of the Relating Concept field 126 may be used to define a "tree" within which the relationship between the Subject and Object concepts of a Relationship table entry exists.

The value of the Order field 130 in each of the entries of the relationship table 120 indicates an ordering aspect of the relationship between child concepts of a common parent concept. For example, the entry 122*g* indicates an ordering value of "ORD A" for the relationship between the Subject concept having a Unique ID of 5, and the Object concept having a Unique ID of 21. The entry 122*i* indicates an ordering value of "ORD_B" for the relationship between the Subject concept having a Unique ID of 5, and the Object concept having a Unique ID of 22. For purposes of example, the Relationship Type of the relationships indicated by the entries 122*g* and 122*i* indicates that the Object concepts are children of a common parent object, indicated by the shared Subject concept having a Unique ID value of 5. Using the Unique IDs in the Concepts table 100 as a key, the ordering values ORD_A and ORD_B indicate, for purposes of example, that the Model X product concept 21 should be displayed before the Model Y product concept 22. In this way, the ordering aspect of each relationship can be used to independently control which product characteristic, product, or product category is displayed first with respect to any other product characteristic, product or product category, having a common parent concept. This ordering between concepts may be utilized to emphasize certain categories, products, or product characteristics over others, for example, in order to display sale items prior to other items.

The Relationship Type field 128 stores a value indicating one of multiple application specific meanings that apply to the relationship between the Subject and Object concepts defined by an entry of the Relationships table 120. In the illustrative embodiment for storing product related information, four Relationship Type field values are defined, each of which provides a specific, associated application specific meaning. For example, a first Relationship Type field value RT_A indicates the "Product Category" application specific meaning, a Relationship Type field value RT_B indicates the "Product" application specific meaning, a Relationship Type field value RT_C indicates that "Product Characteristic" application specific meaning, and a Relationship Type field value RT_D indicates "Possible Value" application specific meaning. While these illustrative application specific meanings are appropriate for the embodiment described with reference to FIG. 4, the disclosed system is not limited to these particular application specific meanings, and other application specific meanings may be used as appropriate for other embodiments of the present invention. Additionally, while the independent aspects of a relationship in the embodiment of FIG. 4 are defined by the contents of separate Relating Concept, Relationship Type, and Order fields for each relationship, other configurations of fields may alternatively be used to impose the relationship aspects and/or application specific meanings appropriate for other specific applications of the disclosed system. It will also be noted that in the disclosed embodiment of FIG. 4, each relationship is represented in a way that permits the Relating Concept, Ordering, and application specific meanings to be independently specified.

As shown in FIG. 4, entry 122*a* indicates that the concept having Unique ID of 50 (Compact Disc Players) has a relationship to the concept with Unique ID of 5 (High End Compact Disc Players) indicating that High End Compact Disc Players is a "Product Category" sub-category within the Compact Disc Players concept. Entry 122*b* indicates that the concept having a Unique ID of 50 (Compact Disc Players) also is associated with the "Product Category" application specific meaning in its relationship to the concept with Unique ID of 7 (Multi-Function Players). Accordingly, Multi-Function Players is also represented as a "Product Category" sub-category within the Compact Disc Players concept.

Entry 122*c* indicates that the Model X concept (Unique ID of 21) is related to the Make Val concept (Unique ID of 11) by a relationship in which the Relating Concept is the Make characteristic (Unique ID of 19).

The values in entry 122*d* indicate that the concept having Unique ID of 50 (CompactDisc Players) has a "Product Characteristic" application specific meaning in its relationship (RT_C) to the concept with Unique ID of 19 (MAKE). Accordingly, MAKE is a "Product Characteristic" for products within the Compact Disc Players concept.

As shown in entry 122*e*, the concept having a Unique ID of 19 (MAKE) has a "Possible Value" application specific meaning associated with its relationship (RT_D) to the concept with Unique ID of 90 (SONY). Accordingly, SONY is a possible value for the MAKE concept. Similarly, as shown in entry 122*f*, the concept having a Unique ID of 20 (SACD) has a "Possible Value" application specific meaning associated with its relationship (RT_D) to the concept with Unique ID of 17 (SACD+). Accordingly, SACD+ is a potential value for the SACD concept.

Entry 122*g* shows that the concept having a Unique ID of 5 (High End Compact Disc Players) has a "Product" application specific meaning associated with its relationship (RT_B) to the concept having a Unique ID of 21 (Model X). Accordingly, Model X is a product within the High End Compact Disc Players concept. As shown by entry 122*h*, the concept having a Unique ID of 7 (Multi-Function Players) has a "Product" application specific meaning associated with its relationship (RT_B) to the concept with Unique ID of 21 (Model X). Accordingly, Model X is a product within the Multi-Function Players concept.

FIGS. 5–7 illustrate an interface for receiving concepts into an embodiment of the disclosed system. FIG. 5 is a screen display showing an "add product" user input context within the Graphical User Interface (GUI) of an illustrative embodiment. FIG. 5 illustrates steps taken by a user to add a concept for a new product to the disclosed system. A user viewing the display shown in FIG. 5, and accordingly viewing a category entitled "CD Players" 200, has clicked on the "Insert" button 202, which resulted in the display of the field 204. The field 204 is shown having been filled in by the user, for example with a product name "Nano-Sonic CD-1". In order to insert this product into the disclosed system, the user then clicks on the "OK" button 208. The system knows, from the input context shown in FIG. 5, that the "Nano-Sonic CD-1" product concept being added should be related to the CD Player 200 category, using a relationship having a "product" application specific meaning aspect.

FIG. 6 shows the state of the illustrative GUI shown from FIG. 5 following the user clicking on the "OK" button 208 of FIG. 5. The screen display of FIG. 6 shows the details regarding the newly added "Nano-Sonic CD-1" product, including several fields for receiving values of different characteristics of the newly added product, like "Part Number" 220, "Marketing Text" 222, and "Product Image" 224. These fields can be filled in by the user, resulting in new values for each of the corresponding characteristics. These prompts for characteristic values are displayed, for example, because the characteristics either have been provided by the user to describe another product under the CD Players category, or because the embodiment of the disclosed system was loaded with them as shared concepts used for organizing and describing audio equipment.

FIG. 7 shows a screen display in which the user is defining a new "Hyper-Surround" characteristic for the "Nano-Sonic CD-1", which did not previously exist in the system. In illustration of FIG. 7, the "Nano-Sonic CD-1" product has a value 230 of "18 channels" for the "Hyper Surround" characteristic 232. FIG. 7 illustrates the ease with which new concepts such as. new product characteristics for specific product categories can be created.

Those skilled in the art should readily appreciate that the programs defining the functions of the disclosed system can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the disclosed system may be embodied in computer software, the disclosed system may alternatively embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method for storing related data, comprising:

establishing a plurality of predetermined application specific meanings, wherein said application specific meanings include product category, product, product characteristic, and possible value meanings, and wherein each of said plurality of predetermined application specific meanings is associated with a corresponding input context;

establishing, subsequent to said establishment of said plurality of predetermined application specific meanings, an account with an information provider;

receiving a plurality of concepts from said information provider through said account;

forming a plurality of relationships between pairs of said plurality of concepts, wherein each one of said relationships indicates a first one of said plurality of concepts as a first related concept, a second one of said plurality of concepts as a second related concept, a third one of said plurality of concepts as a relating concept, and one of said plurality of predetermined application specific meanings as an application specific meaning aspect, and wherein each of said application specific meanings indicated by corresponding ones of said relationships is selected from said plurality of application specific meanings responsive to an input context in which one of said pair of concepts between which said relationship is formed is received; and wherein said forming each of said plurality of relationships includes storing said relationship in an entry in a relationships table, such that said entry refers to said first related concept, said second related concept, and said relating concept, using corresponding ones of a plurality of unique identifiers associated with respective ones of said plurality of concepts, and storing indication of said application specific meaning aspect of said relationship in said entry.

2. The method of claim 1, further comprising:

storing a translation copy of said plurality of concepts, where each concept in said translation copy includes a natural language translation of an aspect of a corresponding one of said plurality of concepts.

3. The method of claim 2, wherein said storing said natural language translation of said aspect of said corresponding one of said plurality of concepts comprises storing a natural language translation of a concept name associated with said corresponding one of said plurality of concepts.

4. The method of claim 1, further comprising storing an associated programmatic representation for each one of said concepts in said plurality of concepts.

5. The method of claim 4, wherein said storing of said programmatic representation comprises storing a standard, text-based computer readable format that is sharable across different computers.

6. The method of claim 4, wherein said storing each one of said programmatic representations comprises storing an Extensible Markup Language (XML) representation of said associated one of said plurality of concepts.

7. The method of claim 1, further comprising:

forming an independent ordering aspect for each of a first one of said plurality of relationships and a second one of said plurality of relationships, wherein said first one of said plurality of relationships and said second one of said plurality of relationships have the same first related concept, and wherein said ordering aspect for each of said first one of said plurality of relationships and said second one of said plurality of relationships provides indication of an order between said second related concept of said first one of said plurality of relationships and said second related concept of said second one of said plurality of relationships.

8. The method of claim 7 further comprising:

forming an independent ordering aspect for each of a third one of said plurality of relationships and a fourth one of said plurality of relationships, wherein said third one of said relationships and said fourth one of said relationships have the same second related concept, and wherein said ordering aspect for each of said third one of said plurality of relationships and said fourth one of said plurality of relationships provides indication of an order between said first related concept of said third one of said plurality of relationships and said first related concept of said fourth one of said plurality of relationships.

9. The method of claim 7, wherein said first one of said plurality of relationships and said second one of said plurality of relationships both have one of said plurality of predetermined application specific meanings as an application specific meaning aspect, and wherein said first related concept of said first one of said plurality of relationships is the same as said first related concept of said second one of said plurality of relationships, and wherein said one of said plurality of predetermined application specific meanings further indicates that said first one of said plurality of relationships is a parent concept to both said second related concept of said first one of said plurality of relationships, and said second related concept of said second one of said plurality of relationships.

10. The method of claim 1, wherein said application specific meaning aspect of said relationship further indicates that said first one of said plurality of concepts is a parent concept to said second one of said plurality of concepts.

11. The method of claim 1, wherein said receiving said plurality of concepts includes receiving at least one shared concept and at least one private concept.

12. The method of claim 1, wherein said input context comprises a graphical user interface (GUI) context.

13. The method of claim 1, wherein said input context comprises a context within an import file, and wherein said context within said import file is defined by one or more tags.

14. The method of claim 1, wherein said input context comprises a position within an input stream.

15. The method of claim 1, further comprising storing said plurality of concepts in a first, relatively low speed storage device, and storing said relationships table in a second, relatively high speed storage device.

16. A system for storing related data, comprising:

at least one processor;

at least one memory, said memory storing a computer program executable on said at least one processor, said computer program operable to establish a plurality of predetermined application specific meanings, wherein said application specific meanings include product category, product, product characteristic, and possible value meanings, and wherein each of said plurality of predetermined application specific meanings is associated with a corresponding input context;

establish, subsequent to said establishment of said plurality of predetermined application specific meanings, an account with an information provider;

receive a plurality of concepts from said information provider through said account;

form a plurality of relationships between pairs of said plurality of concepts, wherein each one of said relationships indicates a first one of said plurality of concepts as a first related concept, a second one of said plurality of concepts as a second related concept, a third one of said plurality of concepts as a relating concept, and one of said plurality of predetermined application specific meanings as an application specific meaning aspect, and wherein each of said application specific meanings indicated by corresponding ones of said relationships is selected from said plurality of application specific meanings responsive to an input context in which one of said pair of concepts between which said relationship is formed is received; and wherein said computer program is operable to form each of said plurality of relationships includes by storing said relationship in an entry in a relationships table, such that said entry refers to said first related concept, said second related concept, and said relating concept, using corresponding ones of a plurality of unique identifiers associated with respective ones of said plurality of concepts, and by storing indication of said application specific meaning aspect of said relationship in said entry.

17. A computer program product including a computer readable medium, said computer readable medium having a computer program stored thereon, said computer program comprising:

program code for establishing a plurality of predetermined application specific meanings, wherein said application specific meanings include product category, product, product characteristic, and possible value meanings, and wherein each of said plurality of predetermined application specific meanings is associated with a corresponding input context;

program code for establishing, subsequent to said establishment of said plurality of predetermined application specific meanings, an account with an information provider;

program code for receiving a plurality of concepts from said information provider through said account;

program code for forming a plurality of relationships between pairs of said plurality of concepts, wherein each one of said relationships indicates a first one of said plurality of concepts as a first related concept, a second one of said plurality of concepts as a second related concept, a third one of said plurality of concepts as a relating concept, and one of said plurality of predetermined application specific meanings as an application specific meaning aspect, and wherein each of said application specific meanings indicated by corresponding ones of said relationships is selected from said plurality of application specific meanings responsive to an input context in which one of said pair of concepts between which said relationship is formed is received; and wherein said program code for forming each of said plurality of relationships includes program code for storing said relationship in an entry in a relationships table, such that said entry refers to said first related concept, said second related concept, and said relating concept, using corresponding ones of a plurality of unique identifiers associated with respective ones of said plurality of concepts, and storing indication of said application specific meaning aspect of said relationship in said entry.

18. A system for storing related data, comprising:

means for establishing a plurality of predetermined application specific meanings, wherein said application specific meanings include product category, product, product characteristic, and possible value meanings, and wherein each of said plurality of predetermined application specific meanings is associated with a corresponding input context;

means for establishing, subsequent to said establishment of said plurality of predetermined application specific meanings, an account with an information provider;

means for receiving a plurality of concepts from said information provider through said account;

means for forming a plurality of relationships between pairs of said plurality of concepts, wherein each one of said relationships indicates a first one of said plurality of concepts as a first related concept, a second one of said plurality of concepts as a second related concept, a third one of said plurality of concepts as a relating concept, and one of said plurality of predetermined application specific meanings as an application specific meaning aspect, and wherein each of said application specific meanings indicated by corresponding ones of said relationships is selected from said plurality of application specific meanings responsive to an input context in which one of said pair of concepts between which said relationship is formed is received; and wherein said means for forming each of said plurality of relationships includes means for storing said relationship in an entry in a relationships table, such that said entry refers to said first related concept, said second related concept, and said relating concept, using corresponding ones of a plurality of unique identifiers associated with respective ones of said plurality of concepts, and storing indication of said application specific meaning aspect of said relationship in said entry.

\* \* \* \* \*

UNITED STATES PATENT AND TRADEMARK OFFICE
CERTIFICATE OF CORRECTION

PATENT NO. : 6,519,588 B1  
DATED : February 11, 2003  
INVENTOR(S) : Jurgen Leschner

It is certified that error appears in the above-identified patent and that said Letters Patent is hereby corrected as shown below:

Column 9,
Line 67, ""SSONY™"" should read -- "SONY™" --; and

Column 12,
Line 44, ""ORD A"" should read -- "ORD_A" --.

Signed and Sealed this

Eighteenth Day of May, 2004

JON W. DUDAS
*Acting Director of the United States Patent and Trademark Office*